United States Patent
Hyodo et al.

(10) Patent No.: US 8,315,783 B2
(45) Date of Patent: Nov. 20, 2012

(54) ENGINE CONTROL DEVICE FOR WORKING VEHICLE

(75) Inventors: Koji Hyodo, Kasumigaura (JP); Hiroki Nakazono, Ryugasaki (JP); Nobuhiro Suzuki, Ryugasaki (JP); Atsushi Shimazu, Toride (JP); Masaki Yoshikawa, Kasama (JP); Kentaro Itoga, Tsukuba (JP); Kazuo Chonan, Moriya (JP); Tomoo Takahashi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 409 days.

(21) Appl. No.: 12/739,535

(22) PCT Filed: Oct. 24, 2008

(86) PCT No.: PCT/JP2008/069347
§ 371 (c)(1),
(2), (4) Date: Apr. 23, 2010

(87) PCT Pub. No.: WO2009/054499
PCT Pub. Date: Apr. 30, 2009

(65) Prior Publication Data
US 2010/0262353 A1 Oct. 14, 2010

(30) Foreign Application Priority Data
Oct. 24, 2007 (JP) .................... 2007-276075

(51) Int. Cl.
*F02D 41/00* (2006.01)

(52) U.S. Cl. ............ 701/110; 123/319; 477/111

(58) Field of Classification Search ............ 701/102, 701/110; 123/319; 477/111
See application file for complete search history.

(56) References Cited

U.S. PATENT DOCUMENTS

| 2008/0093145 A1 | 4/2008 | Matsuyama |
| 2012/0094801 A1* | 4/2012 | Hyodo et al. ............ 477/111 |
| 2012/0100959 A1* | 4/2012 | Hyodo et al. ............ 477/111 |

FOREIGN PATENT DOCUMENTS

JP 3-50034 A 3/1991

(Continued)

OTHER PUBLICATIONS

International Search Report dated Nov. 25, 2008, (two (2) pages).

*Primary Examiner* — Hai Huynh
(74) *Attorney, Agent, or Firm* — Crowell & Moring LLP

(57) ABSTRACT

There are provided: a pedal operation amount detection unit 12 that detects an operation amount s of the accelerator pedal 11; a speed ratio detection unit 14, 15 that detects a speed ratio e of an input shaft and an output shaft of the torque converter 2; a load pressure detection unit 16 that detects a load pressure P of the hydraulic pump 6; a speed stage detection unit 18 that detects a low speed stage of a transmission 3 capable of varying a speed stage between a low speed stage and a high speed stage; and a speed limiting unit 10 that limits a maximum speed of the engine 1 to a lower speed upon satisfaction of following speed limitation conditions: at least a pedal operation amount s is equal to or greater than a predetermined value s1, a speed ratio e is equal to or less than a predetermined value ea, a load pressure P is equal to or greater than a predetermined value Pa, and the low speed stage of the transmission has been detected.

10 Claims, 16 Drawing Sheets

FOREIGN PATENT DOCUMENTS

| | | |
|---|---|---|
| JP | 4-41822 A | 2/1992 |
| JP | 5-295760 A | 11/1993 |
| JP | 2003-184134 A | 7/2003 |
| JP | 2005-61322 A | 3/2005 |
| WO | WO 2006/062018 A1 | 6/2006 |

* cited by examiner (a) P MODE (b) N MODE (c) L MODE (a)

(b)

(a)

(b)

(a)

(b)

(a)

(b)

ENGINE CONTROL DEVICE FOR WORKING VEHICLE

TECHNICAL FIELD

The present invention relates to an engine control device for a working vehicle such as a wheel loader and the like.

BACKGROUND ART

There are devices known in the related art that change engine output torque characteristics in response to mode selection of a workload mode and a fuel economy saving mode (refer to, for instance, Patent Reference Literature 1). Such a device disclosed in Patent Reference Literature 1 is configured so that engine output torque in a high rotation region is set lower when the fuel economy saving mode is selected than that when the workload mode is selected and so that the maximum pump absorption torque is also set lower. As a result, great travel driving force can be obtained regardless of the mode selection.

Patent reference literature 1: Japanese Laid Open Patent Publication No. 2005-61322

DISCLOSURE OF THE INVENTION

Problems to be Solved by the Invention

However, in the event that, for example, an excavation work is performed using a wheel loader, a greater travel driving force may result in a greater reaction force exerted upon a lift arm when a bucket is dug into a mound, thereby reducing the lifting force of the lift arm, which may reduce workability.

Means for Solving the Problems

An engine control device for a working vehicle, according to the present invention, that comprise: a rotation speed control unit that controls a rotation speed of an engine according to an operation amount of an accelerator pedal; a hydraulic pump driven by the engine, that supplies a driving pressure to a working actuator upon which a reaction force according to a travel driving force is exerted; and a travel drive device that transmits a rotation of the engine to wheels through a torque converter, comprises: a pedal operation amount detection unit that detects an operation amount of the accelerator pedal; a speed ratio detection unit that detects a speed ratio of an input shaft and an output shaft of the torque converter; a load pressure detection unit that detects a load pressure of the hydraulic pump; a speed stage detection unit that detects a low speed stage of a transmission capable of varying a speed stage between a low speed stage and a high speed stage; and a speed limiting unit that limits a maximum speed of the engine to a lower speed upon satisfaction of following speed limitation conditions: at least a pedal operation amount having been detected by the pedal operation amount detection unit is equal to or greater than a predetermined value, a speed ratio having been detected by the speed ratio detection unit is equal to or less than a predetermined value, a load pressure having been detected by the load pressure detection unit is equal to or greater than a predetermined value, and the low speed stage of the transmission has been detected by the speed stage detection unit.

Moreover, an engine control device for a working vehicle, according to the present invention, that comprises: a rotation speed control unit that controls a rotation speed of an engine according to an operation amount of an accelerator pedal; a hydraulic pump driven by the engine, that supplies driving pressure to a working actuator upon which a reaction force according to a travel driving force is exerted; and a travel drive device that transmits a rotation of the engine to wheels through a torque converter, wherein the engine control device for a working vehicle comprises: a pedal operation amount detection unit that detects an operation amount of the accelerator pedal; a speed ratio detection unit that detects a speed ratio of an input shaft and an output shaft of the torque converter; an operation detection unit that detects an operation of the working actuator; a speed stage detection unit that detects a low speed stage of a transmission capable of varying a speed stage between a low speed stage and a high speed stage; and a speed limiting unit that limits a maximum speed of the engine to a lower speed upon satisfaction of following speed limitation conditions: at least an operation of the working actuator is detected by the operation detection unit, a pedal operation amount having been detected by the pedal operation amount detection unit is equal to or greater than a predetermined value, a speed ratio having been detected by the speed ratio detection unit is equal to or less than a predetermined value, and the low speed stage of the transmission has been detected by the speed stage detection unit.

When the transmission is capable of being shifted into at least three speeds or more, the speed stage detection unit may detect the low speed stage when a speed stage is at a second speed or lower.

It is preferable that the speed limiting unit limits a maximum speed of the engine upon satisfaction of the speed limitation conditions being continued for a predetermined period of time.

It is also possible to provide a mode selection unit that selects a travel mode so that the speed limiting unit varies a limit value of a maximum speed of the engine according to a travel mode having been selected by the mode selection unit.

The speed limiting unit may reduce a limit value of a maximum speed of the engine over a course of time.

Advantageous Effect of the Invention

According to the present invention, travel driving force when working can be reduced and workability can be improved because it is arranged that the maximum speed of an engine is limited to lower speed when at least a pedal operation amount is equal to or greater than a predetermined value, a speed ratio of a torque converter is equal to or less than a predetermined value, a pump load pressure is equal to or greater than a predetermined value, and a speed stage of a transmission is at a low speed stage, or when at least an operation of a working actuator is detected, the pedal operation amount is equal to or greater than a predetermined value, the speed ratio of the torque converter is equal to or less than a predetermined value, and the speed stage of the transmission is at the low speed stage.

BEST MODE FOR CARRYING OUT THE INVENTION

The First Embodiment

An engine control device for a working vehicle according to the first embodiment of the present invention will now be explained with reference to FIG. 1 to FIG. 9.

Figure 1:
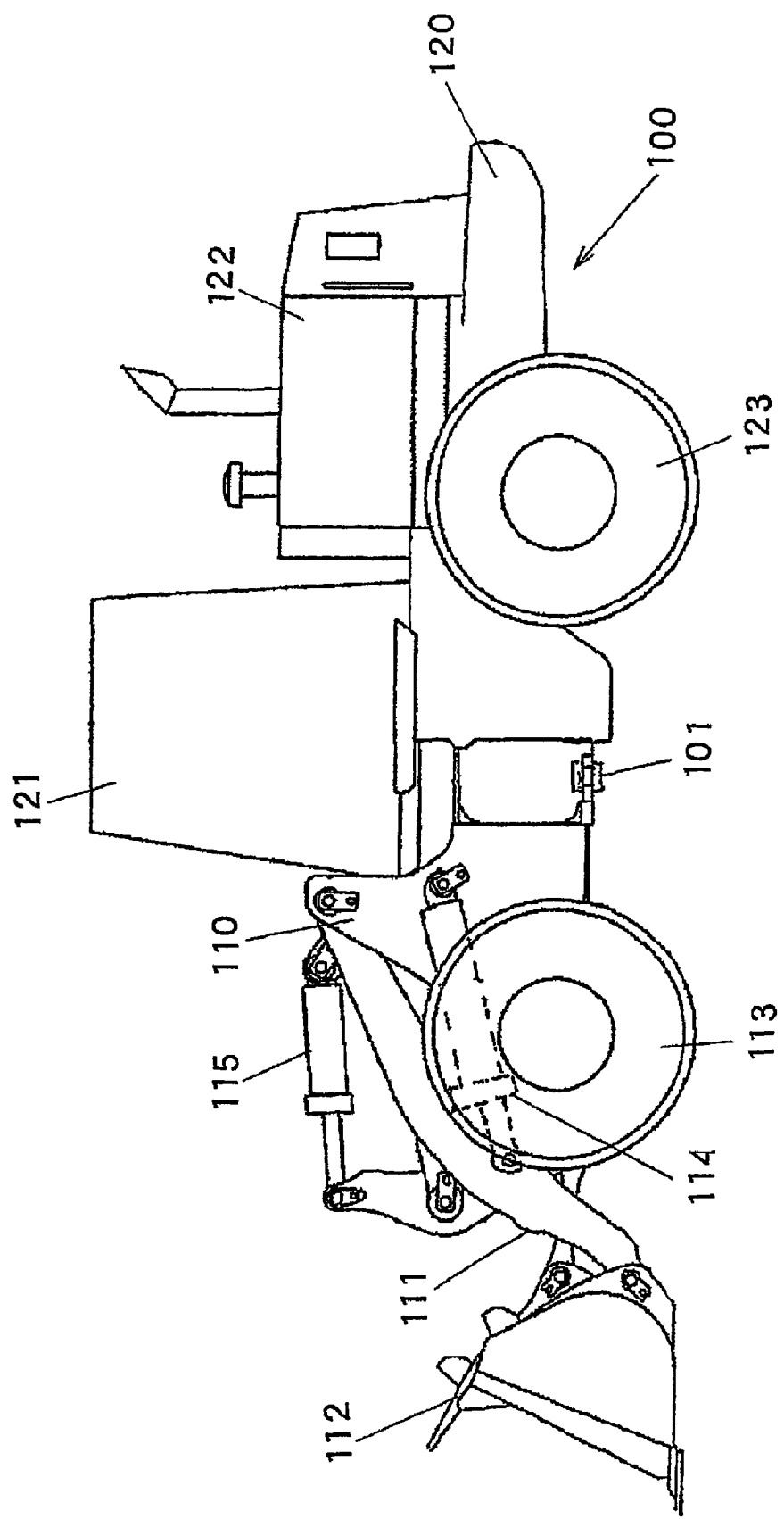
FIG. 1 A side view of a wheel loader related to an embodiment of the present invention.

FIG. 1 is a side view of a wheel loader that is an example of a working vehicle in which the engine control device according to the present embodiment is adopted. A wheel loader 100 is constituted with a front body 110 that includes an arm 111, a bucket 112, tires 113, and the like and a rear body 120 that includes an operator's cab 121, an engine compartment 122, tires 123, and the like. The arm 111 vertically rotates (rises and lowers) by drive of an arm cylinder 114, and the bucket 112 vertically rotates (dumps or crowds) by drive of a bucket cylinder 115. The front body 110 and the rear body 120 are rotatably connected with each other by a center pin 101, so that the front body 110 swings side to side with respect to the rear body 120 by expansion and contraction of a steering cylinder (not shown in the figures).

Figure 2:
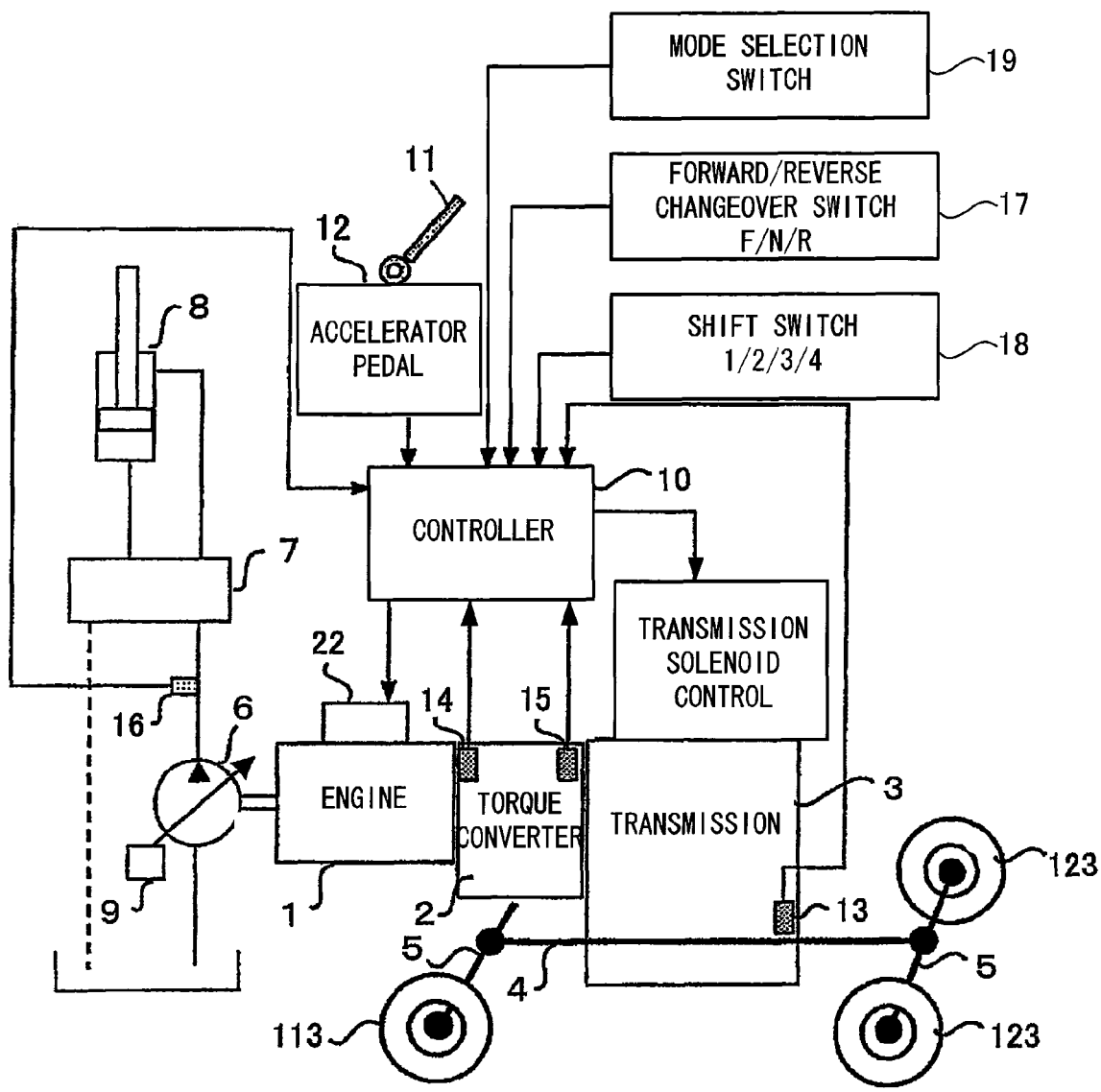
FIG. 2 A diagram showing the general structure of an engine control device according to a first embodiment of the present invention.
Figure 3:
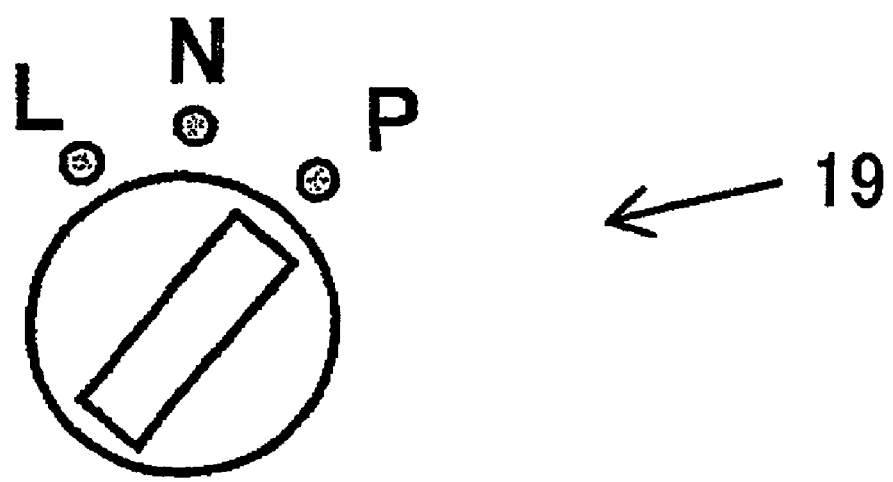
FIG. 3 An illustration showing a mode selection switch according to the first embodiment.

FIG. 2 is a diagram showing the general structure of the engine control device according to the first embodiment. An input shaft of a torque converter 2 is connected to an output shaft of an engine 1, and an output shaft of the torque converter 2 is connected to a transmission 3. The torque converter 2 is a fluid clutch constituted with a well-known impeller, a turbine, and a stator, and rotation of the engine 1 is transmitted to the transmission 3 through the torque converter 2. The transmission 3 includes a hydraulic clutch that shifts the speed stage thereof, and rotation of the output shaft of the torque converter 2 is shifted by the transmission 3. After being shifted, the rotation is transmitted to the tires 113 and 123 through a propeller shaft 4 and axles 5, so that the vehicle travels.

A variable displacement hydraulic pump for working 6 is driven by the engine 1 so as to discharge pressure oil. Discharged oil from the hydraulic pump 6 is led to a working actuator 8 (for instance, the arm cylinder 114) through a control valve 7, so that the actuator 8 is driven. The control valve 7 is operated with an operation lever (not shown in the figures) so as to control the flow of pressure oil from the hydraulic pump 6 to the actuator 8. The pump displacement is varied by the regulator 9. The regulator 9 varies the pump displacement according to the pump discharge pressure and performs a constant torque control, for example, so that the work torque becomes constant. It is to be noted that the hydraulic pump 6 may be a fixed displacement pump such as a gear pump.

The controller 10 is constituted including an arithmetic processing unit that includes a CPU, a ROM, a RAM, other peripheral circuits, and the like. The following are connected to the controller 10: an accelerator operation amount detector 12 that detects an operation amount s of the accelerator pedal 11, a vehicle speed detector 13 that detects the rotation speed of an output shaft of the transmission 3, i.e., the vehicle speed, a rotation speed detector 14 that detects a rotation speed Ni of the input shaft of the torque converter 2, a rotation speed detector 15 that detects a rotation speed Nt of the output shaft of the torque converter 2, a pressure detector 16 that detects a discharge pressure P of the hydraulic pump 6, a forward/reverse changeover switch 17 for instructing advancing and reversing the vehicle, a shift switch 18 that instructs the upper limit of the speed stage between the first to the fourth speeds, and a mode selection switch 19 that selects the travel mode. The mode selection switch 19 is, for instance, a dial switch shown in FIG. 3, and the P mode, the N mode, and the L mode in addition to the normal mode can be selected by operating the switch 19. The normal mode is selected by an operation of a switch not shown in the figure.

Figure 4:
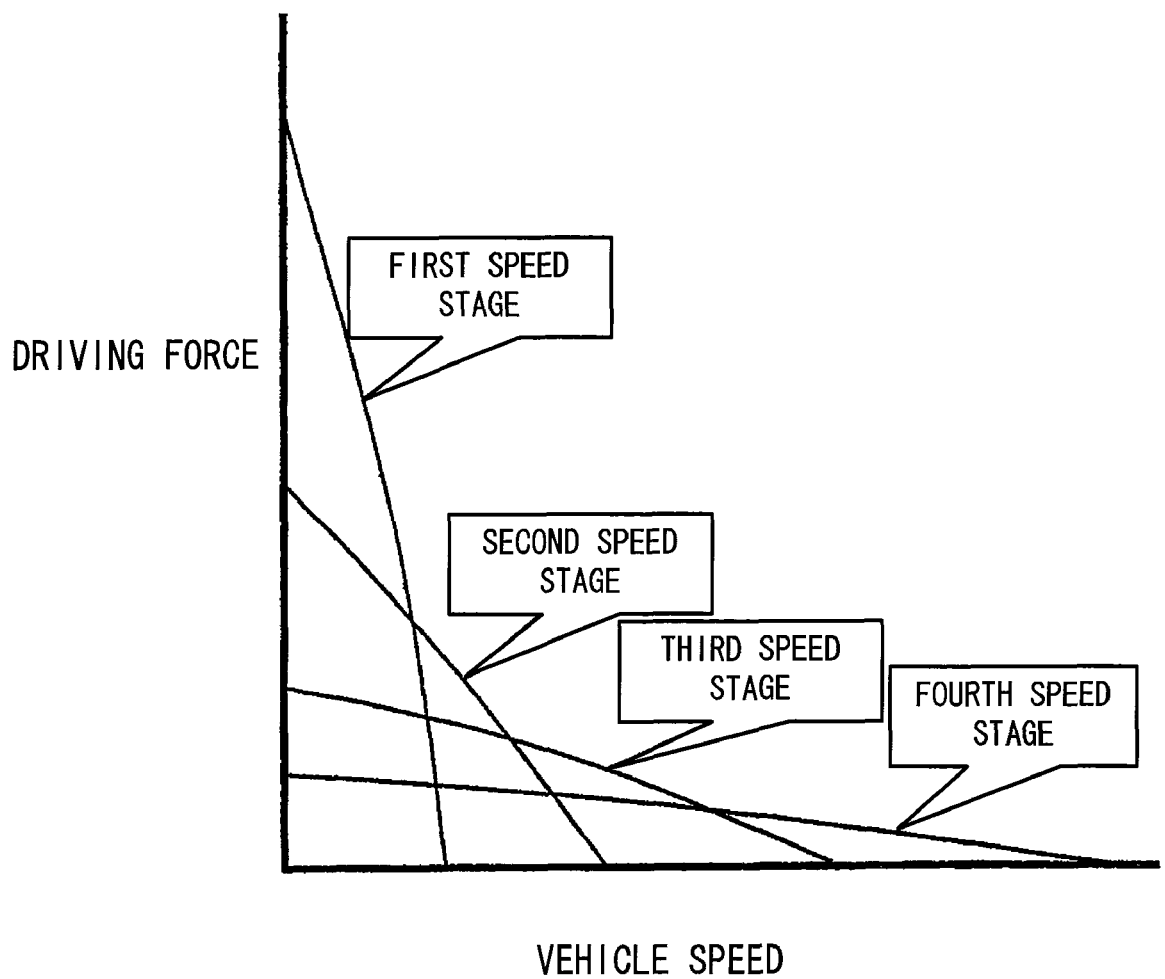
FIG. 4 A diagram showing the relationships between vehicle speed and driving force at each of the speed stages.

The torque converter 2 has a function to increase output torque with respect to input torque, i.e., the function to make the torque ratio 1 or greater. The torque ratio decreases with an increase in a torque converter speed ratio e (the output rotation speed Nt/the input rotation speed Ni), which is the ratio of the rotation speeds of the input shaft and the output shaft of the torque converter 2. For example, when traveling load increases while traveling with the engine speed in a constant state, the output rotation speed Nt of the torque converter 2, i.e., the vehicle speed decreases and the torque converter speed ratio e is reduced. At this time, since the torque ratio increases, the vehicle can travel with a greater driving force (traction force). The relationships between the vehicle speed at each of the speed stages and the driving force are as shown in FIG. 4, in which driving force is great as the vehicle speed is low (low speed, high torque) while driving force is small as the vehicle speed is high (high speed, low torque) with respect to the same speed stage. In addition, a greater driving force can be obtained at the same vehicle speed as the speed stage is lower.

The transmission 3 is an automatic transmission that includes solenoid valves corresponding to each of the speed stages of the first speed to the fourth speed. These solenoid valves are driven by a control signal output from the controller 10 to a solenoid control unit 21.

There are two methods of automatic transmission control: one is torque converter speed ratio reference control in which the speed stages are shifted when the torque converter speed ratio e reaches a predetermined value; and the other is vehicle speed reference control in which the speed stages are shifted when the vehicle speed reaches a predetermined value. In the present embodiment, the explanation is based on the assumption that the speed stage of the transmission 3 is controlled by torque converter speed ratio reference control.

Figure 5:
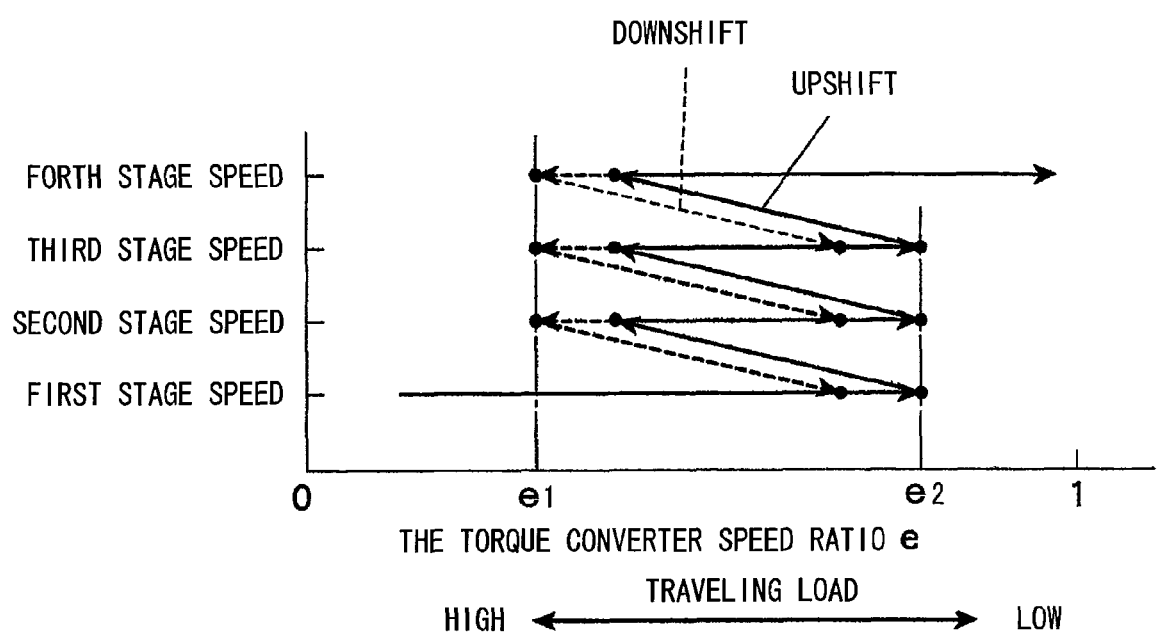
FIG. 5 A diagram showing the timing of shift transmission by torque converter speed ratio reference control.

FIG. 5 is a diagram showing the timing of shift transmission by torque converter speed ratio reference control. A torque converter speed ratio e1 that serves as a reference of upshift and a torque converter speed ratio e2 that serves as a reference of downshift are stored in the controller 10 in advance.

Based on signals from the rotation speed detectors 14 and 15, the controller 10 calculates the torque converter speed ratio e, outputs an upshift signal to the solenoid control unit 21 when the calculated speed ratio e becomes greater than the reference speed ratio e1, and outputs a downshift signal to the solenoid control unit 21 when the calculated speed ratio e becomes smaller than the reference speed ratio e2. As a result, the speed stage of the transmission 3 is automatically changed between the first speed and the fourth speed according to the torque converter speed ratio e. In other words, when the traveling load becomes low and the torque converter speed ratio e increases, so that the torque converter speed ratio e becomes equal to or greater than the predetermined value e1, the speed stage upshifts by one stage. On the contrary, when the traveling load becomes high and the torque converter speed ratio e decreases, so that the torque converter speed ratio e becomes equal to or less than the predetermined value e2, the speed stage downshifts by one stage. At this time, the speed stage is automatically shifted, with the speed stage selected by the shift switch 18 as an upper limit. For instance, the speed stage is set to the first speed or the second speed when the second speed is selected by the shift switch 18, while the speed stage is fixed to the first speed when the first speed is selected.

It is to be noted that although it is arranged that the speed stage is shifted when the torque converter speed ratio e reaches the predetermined value, it may also be arranged that the speed stage is shifted when the vehicle speed reaches a predetermined value. In that case, an upshift signal or a downshift signal may be output to the solenoid control unit 21 according to a signal from the vehicle speed detector 13.

The controller 10 controls the engine speed to a target engine speed according to an operation amount of an accelerator pedal 12. More specifically, as a depression amount of the accelerator pedal 12 becomes greater, the target engine speed becomes greater, and the controller 10 outputs a control signal corresponding to this target engine speed to an engine control unit 22, thereby controlling the engine speed.

Figure 6:
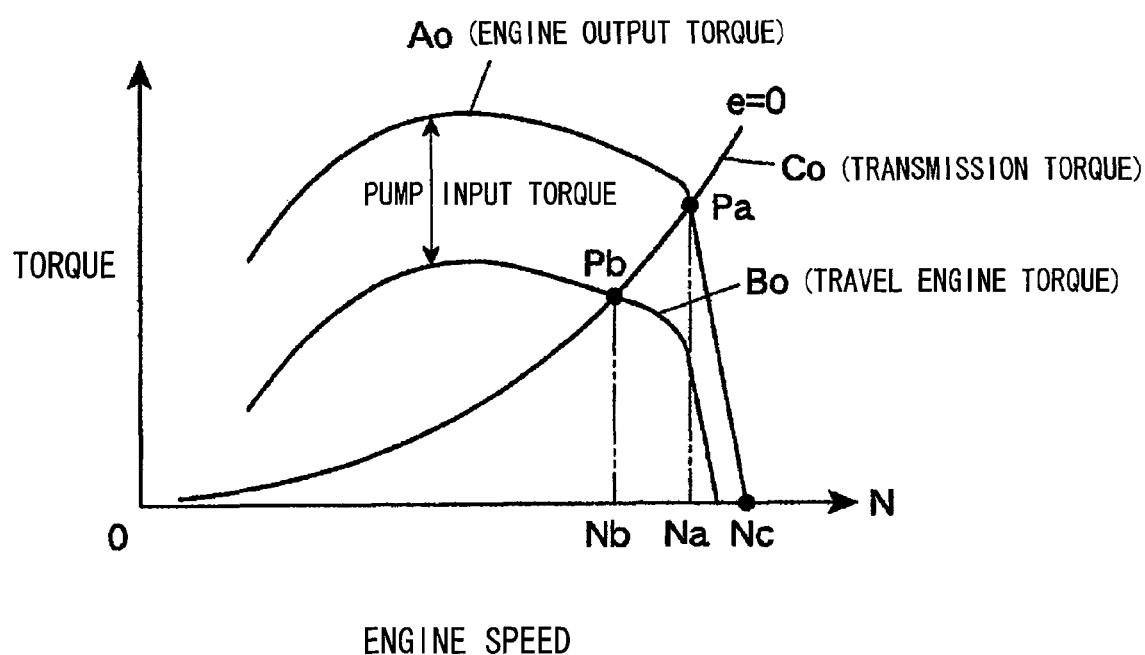
FIG. 6 A diagram showing torque characteristics when an accelerator pedal is fully depressed in normal mode.

FIG. 6 is a traveling performance diagram (torque diagram) showing the relationship between the engine speed and torque when the accelerator pedal 12 is fully depressed in the normal mode. In the figure, a characteristic A0 is an output torque (engine output torque) of the engine 1, and the difference between the characteristic A0 and a characteristic B0 corresponds to the maximum absorption torque (pump input torque) of the hydraulic pump 6. The characteristic B0, which is obtained by shifting the characteristic A0 downward by pump input torque, represents the engine torque for traveling which can be used for traveling. It is to be noted that although the pump input torque varies according to the work and the torque usable for travel varies accordingly. The figure presents the characteristic B0 of the travel engine torque corresponding to a typical pump input torque during excavation work.

A characteristic C0 in FIG. 6 is an input torque (transmission torque) of the transmission 3 when the transmission 3 is driven by the engine 1, in which the transmission torque increases with an increase in an engine speed N. The characteristic C0 is the characteristic when the torque converter speed ratio e is zero while he transmission torque decreases with an increase in the torque converter speed ratio e (refer to a characteristic C1 of FIG. 7).

A point of intersection Pb of the characteristic B0 with the characteristic C0 is a matching point during excavation work, and the engine speed becomes a value Nb corresponding to the matching point. It is to be noted that a point of intersection Pa of the characteristic A0 with the characteristic C0 is a matching point when the pump input torque is zero, i.e., when the pump 6 is in an unloaded state, and the engine speed at that time is Na. The engine speed N varies over the range of $Nb \leq N \leq Na$ according to the magnitude of the pump input torque. It is to be noted that the maximum speed of the engine 1 is Nc in a pump unloaded state.

When the engine speed N is at the matching point, the travel driving force is proportional to the square of this engine speed N. When the bucket 112 is dug into a mound of soil or the like during excavation work, a reaction force is exerted upon the lift arm 111 from the soil or the like. At this time, if the travel driving force is too great, the reaction force becomes great so that the lifting force of the lift arm 111 decreases, resulting in reduced workability. To prevent this, it is necessary to reduce the travel driving force by reducing the engine speed. However, it is complicated for the operator to perform so by adjusting the operation amount of the accelerator pedal 12. In the present embodiment, therefore, upon satisfaction of a predetermined condition, the maximum speed of the engine 1 is limited lower than that in the normal mode so as to automatically lowers the matching point of the engine speed, thereby reducing the travel driving force.

Figure 7:
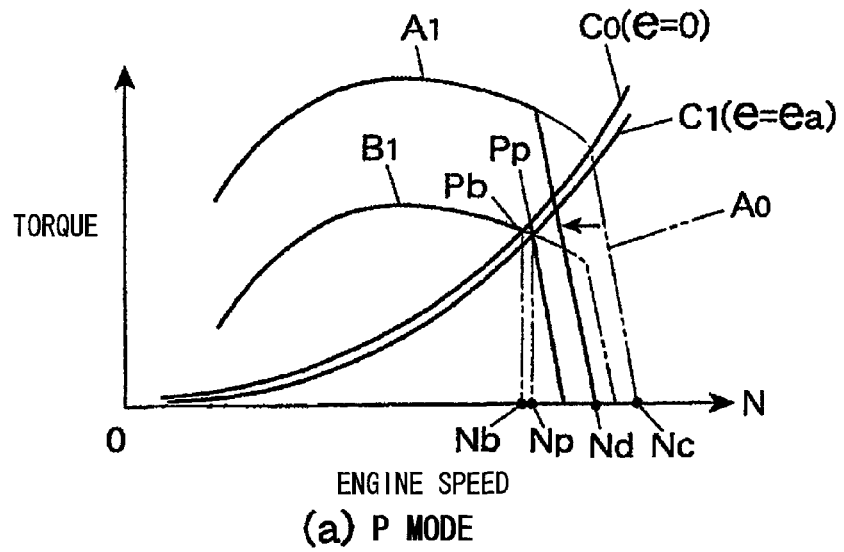
FIG. 7 (a) to (c) Diagrams showing torque characteristics in P mode, N mode, and L mode, respectively, of the engine control device according to the present embodiment.
Figure 7:
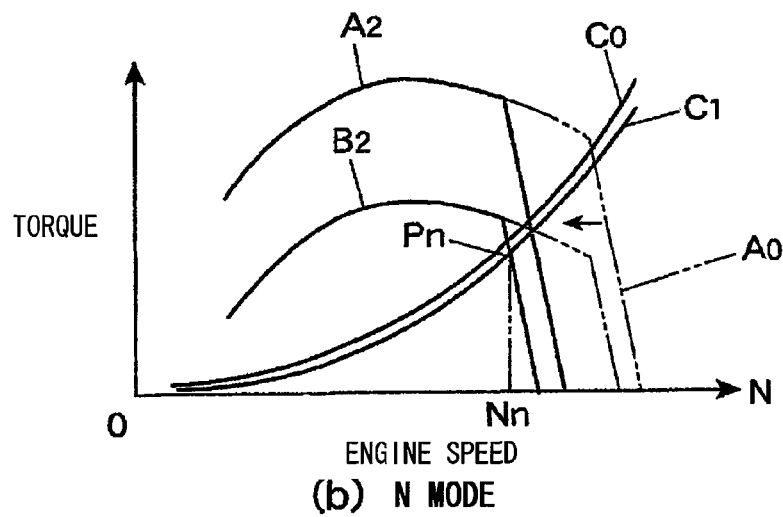
Figure 7:
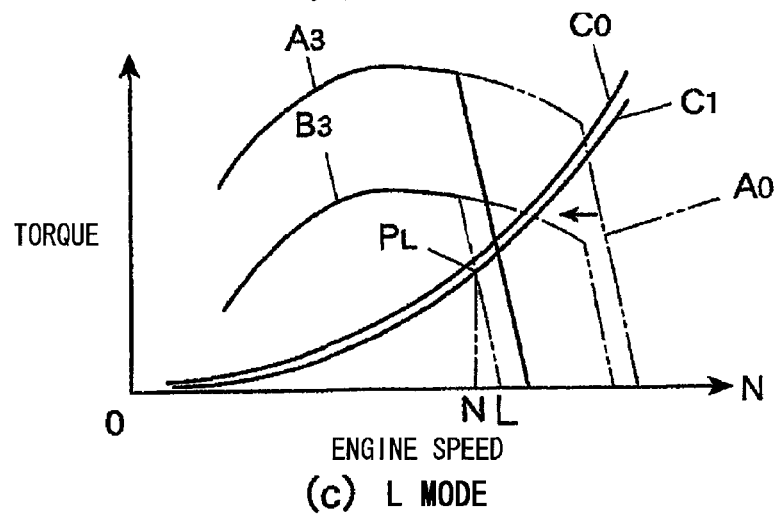

A limit value of the maximum engine speed varies depending upon travel mode. More specifically, a limitation amount increases (the maximum speed decreases) in ascending order of the P mode, the N mode, and the L mode, and the travel driving force decreases in the same ascending order. FIGS. 7 (a) to (c) show torque diagrams corresponding to the P mode, the N mode, and the L mode, respectively. The torque characteristics A1 to A3 are each obtained by shifting the engine output torque characteristic A0 (FIG. 6) of the high rotation area when the accelerator pedal 11 is fully depressed to the low rotation side, and correspond to the torque characteristics when the operator returns the accelerator pedal 11.

In the figures, an extent of shift to the low rotation side increases in order of the characteristics A1, A2, and A3, which is the same as the change in the engine output torque when the operation amount of returning of the accelerator pedal 12 is increased. Characteristics B1 to B3 in the figures are travel engine torques corresponding to the characteristics A1 to A3, respectively, and the characteristic C1 is a transmission torque when the torque converter speed ratio e is at a predetermined value ea. The predetermined value ea corresponds to a torque converter speed ratio (for instance, about 0.3) that may be assumed during excavation work. In the present embodiment, upon satisfaction of a predetermined condition (engine speed limitation condition) described later, the engine 1 is controlled so that the upper limit of the engine speed becomes the following rotation speed Np, Nn, or NL according to the travel mode.

As shown in FIG. 7 (a), when the characteristic of the engine output torque is A1, the matching point of the torque converter speed ratio e=0, which is the point of intersection of the characteristic C0 with the characteristic B1, becomes Pb, and the matching point of the torque converter speed ratio e=ea, which is the point of intersection of the characteristic C1 with the characteristic B1, becomes Pp. At this time, the engine speeds at the matching points Pb and Pp are Nb and Np, respectively, and, with the pump input torque being constant, the engine speed N varies over this range (Nb≦N≦Np) during excavation work, so that the maximum value of the engine speed during P mode excavation becomes Np. In this event, the maximum speed when the pump is unloaded is Nd, which is lower than the maximum speed Nc in the normal mode.

The matching point Pb in the P mode when the torque converter speed ratio e=0 is equal to the matching point Pb (FIG. 6) in the normal mode, and the matching point becomes Pb in the range in which the maximum speed in the pump unloaded state falls between Nd and Nc. The matching point Pp in the P mode when the torque converter speed ratio e=ea is also equal to the matching point in the normal mode. Thus, in the P mode, the matching points Pb and Pp, the same as those in the normal mode, are obtained, and the engine 1 is controlled so that the maximum speed when the pump is unloaded becomes the minimum Nd. In other words, the maximum value of the engine speed is limited so that the engine speed becomes equal to or less than Np during excavation work. It is to be noted that if the pedal operation amount when the accelerator pedal 11 is fully depressed is denoted by s0, the characteristic A1 corresponds to a torque characteristic when the operation amount of the accelerator pedal 11 is s1 (<s0).

As shown in FIG. 7 (b), when the characteristic of the engine output torque is A2, the matching point of the torque converter speed ratio e=ea, which is the point of intersection of the characteristic C1 with the characteristic B2, becomes Pn. At this time, the engine speed at the matching point Pn is Nn, and, with the pump input torque being constant, the maximum value of the engine speed during N mode excavation becomes Nn. Thus, in the N mode, the maximum value of the engine speed is limited so that the engine speed becomes equal to or less than Nn during excavation work.

As shown in FIG. 7 (c), when the characteristic of the engine output torque is A3, the matching point of the torque converter speed ratio e=ea, which is the point of intersection of the characteristic C1 with the characteristic B3, becomes PL. At this time, the engine speed at the matching point PL is NL, and, with the pump input torque being constant, the maximum value of the engine speed during L mode excavation becomes NL. Thus, in the L mode, the maximum value of the engine speed is limited so that the engine speed becomes equal to or less than NL during excavation work.

Figure 8:
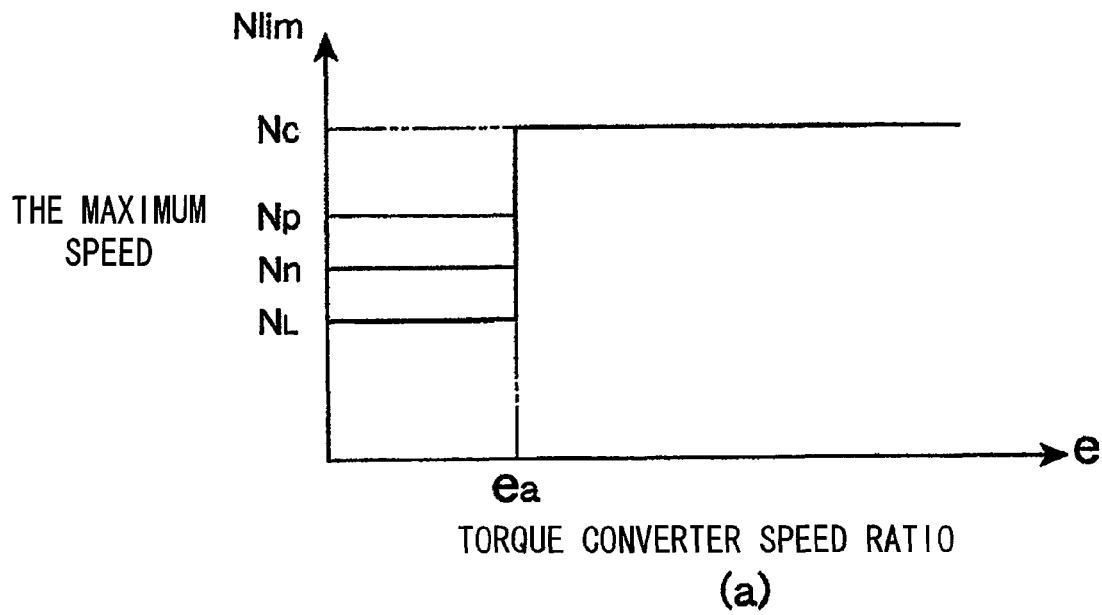
FIG. 8 Diagrams showing characteristics of the maximum engine speeds of the engine control device according to the first embodiment.
Figure 8:
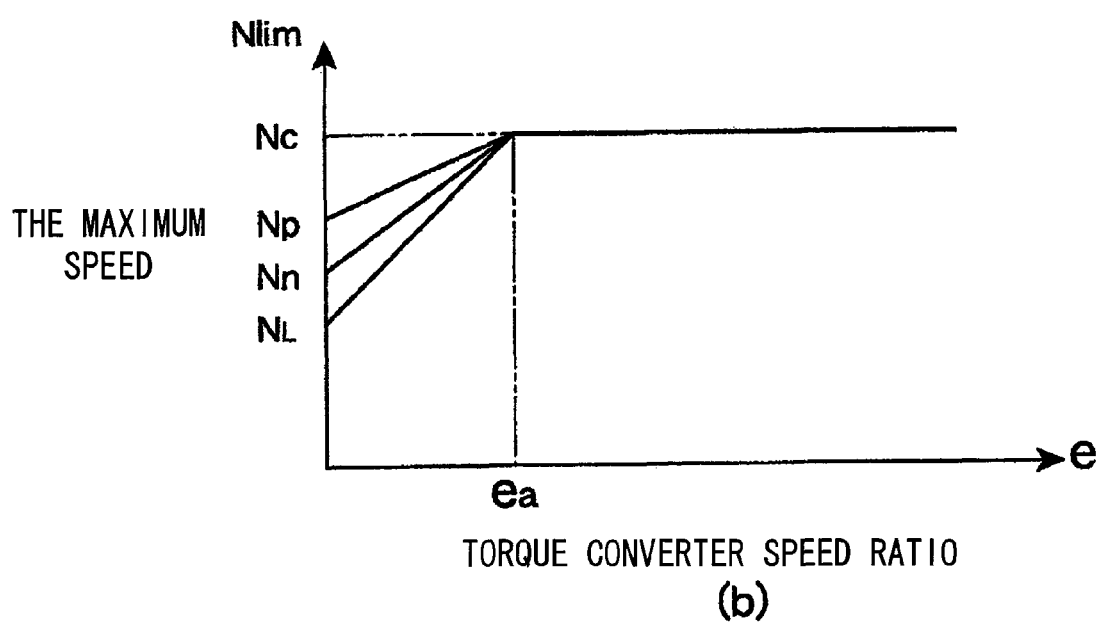

The relationship, as shown in FIG. 8 (a), between the torque converter speed ratio e and the maximum values Np, Nn, and NL (a maximum engine speed Nlim) of the engine speed is stored in the controller 10 in advance. In FIG. 8 (a), in the range in which the torque converter speed ratio e is equal to or less than the predetermined value ea, the maximum engine speed Nlim becomes the maximum value Np, Nn, or NL corresponding to the travel mode, and, in the range in which the torque converter speed ratio e exceeds the predetermined value ea, the maximum engine speed Nlim becomes a maximum Nmax. It is to be noted that as shown in FIG. 8 (b) it may also be arranged that in the range in which the torque converter speed ratio e is equal to or less than the predetermined value ea, the maximum speed Nlim gradually increases with an increase in the torque converter speed ratio e. The controller 10 outputs a control signal to the engine control unit 22 so as to control the maximum speed Nlim.

Figure 9:
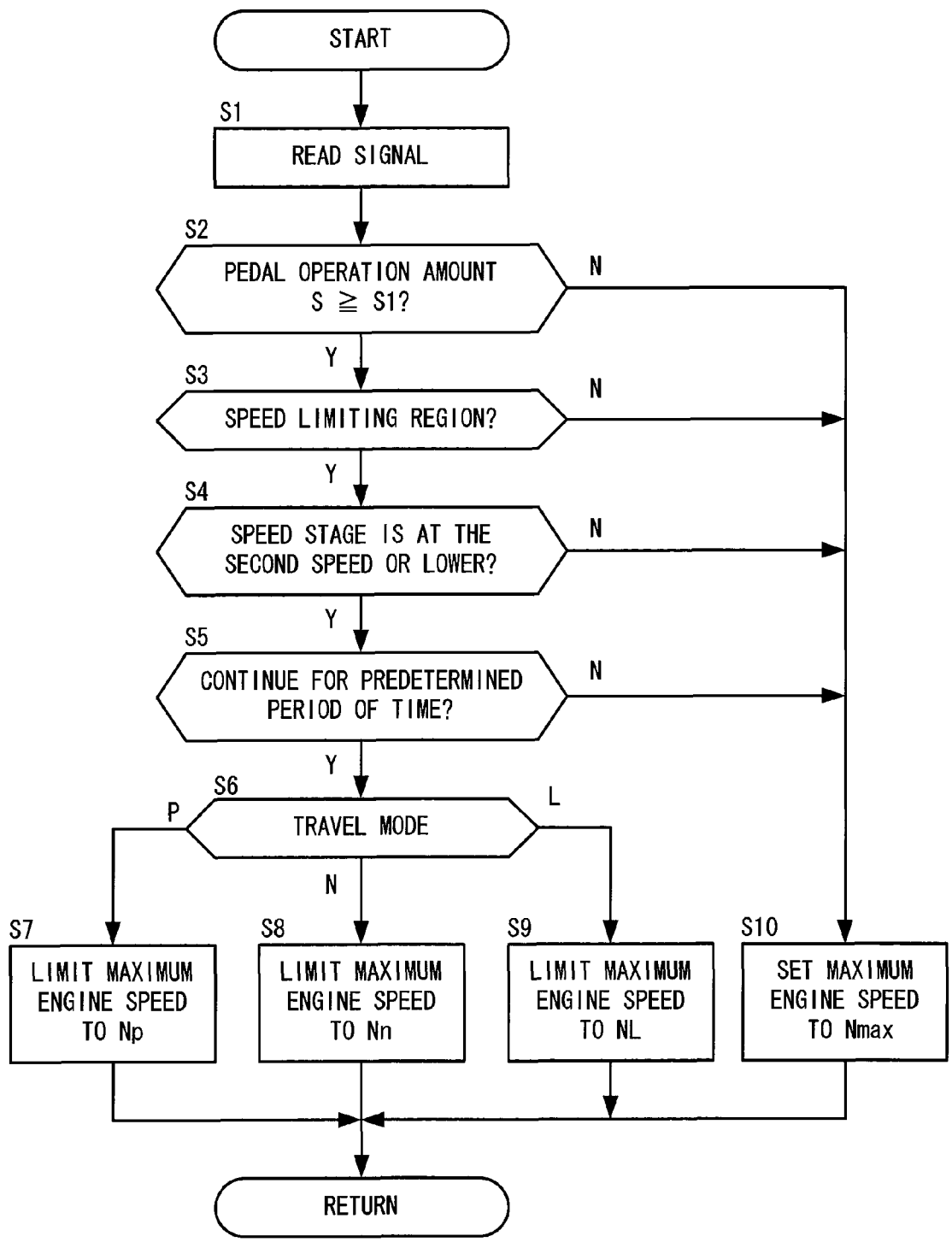
FIG. 9 A flowchart showing an example of processing executed by a controller according to the first embodiment.

FIG. 9 is a flowchart showing an example of processing executed by the controller 10. The processing in this flowchart starts, for example, as an engine key switch is turned on. In a step S1, signals from the variety of detectors 12 to 16 and the switches 17 to 19 are read.

In a step S2, a decision is made as to whether or not the accelerator pedal operation amount s, having been detected by the accelerator operation amount detector 12, is equal to or greater than the predetermined value s1 (s≧s1), i.e., whether or not the maximum speed of the engine 1 in a pump unloaded state is equal to or greater than Nd indicated in FIG. 7 (a). If the result of the decision is YES in the step S2, the flow of control proceeds to a step S3, while if the result of the decision is NO in the step S2, the flow of control proceeds to a step S10.

Figure 10:
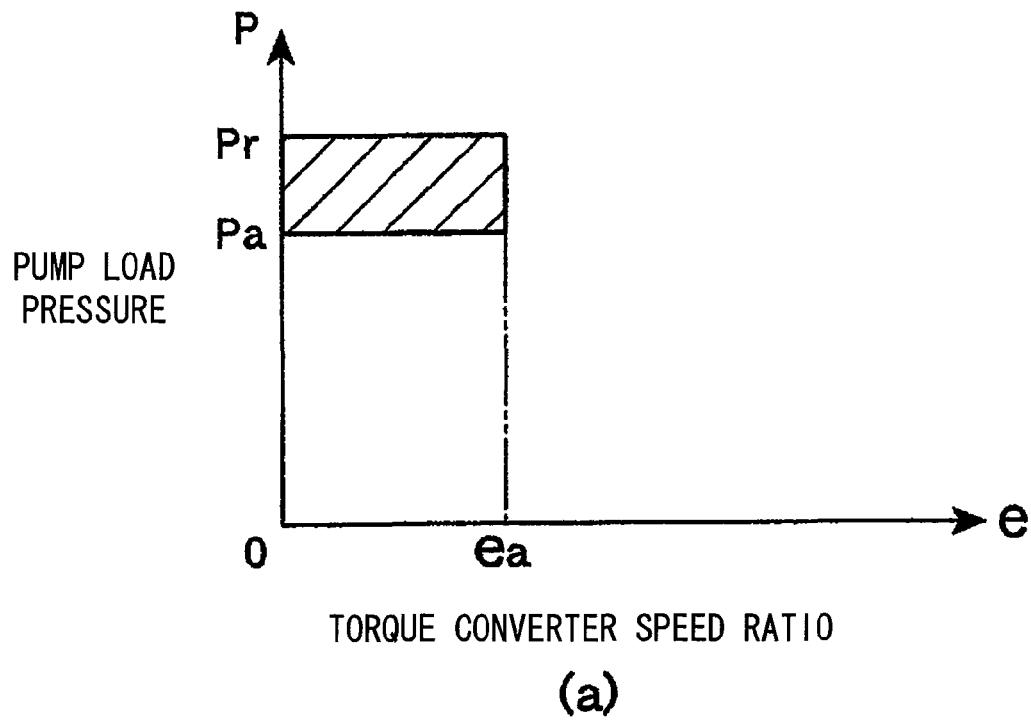
FIG. 10 Diagrams showing a speed limiting region according to the first embodiment.
Figure 10:
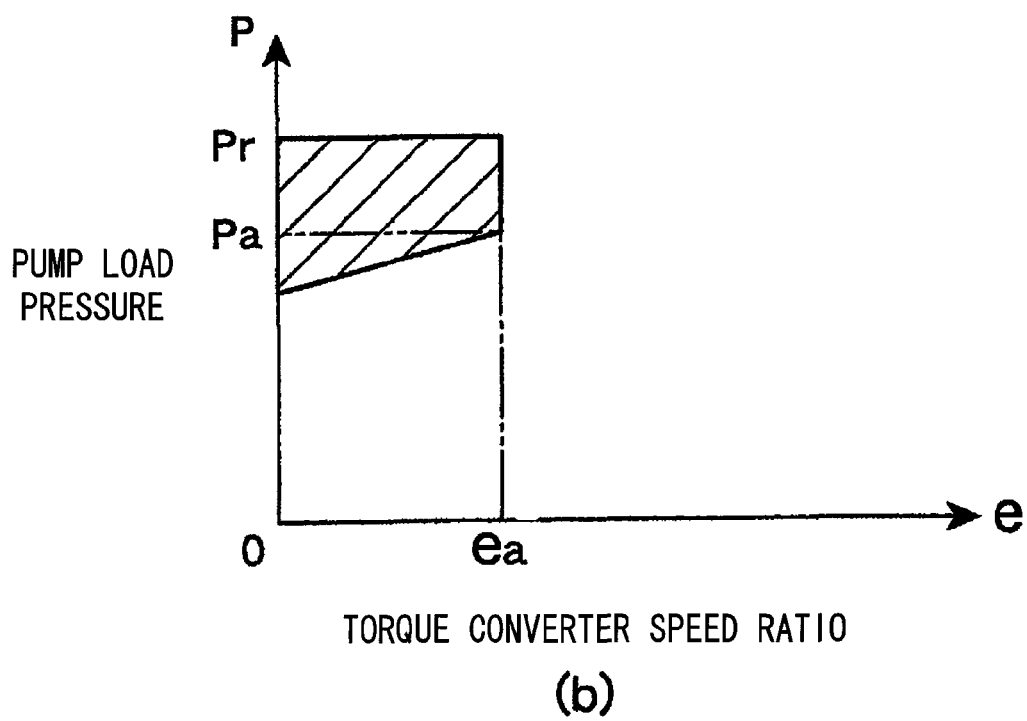

In the step S3, a decision is made as to whether or not the relationship between the torque converter speed ratio which is calculated by signals from the rotation speed detectors 14 and 15, and the pump load pressure P which is detected by the pressure detector 16, is in a predetermined hatched region (speed limiting region) indicated in FIG. 10 (a). In other words, a decision is made as to whether or not the torque converter speed ratio e is equal to or less than the predetermined value ea and the pump load pressure P is equal to or greater than the predetermined value Pa (P≧Pa), which is the load pressure assumed during excavation work. It is to be noted that Pr in the figure corresponds to the relief pressure of the hydraulic pump 6. In place of the threshold of the pump load pressure P being the constant value Pa, a speed limiting region may also be determined so that the threshold of the pump load pressure P becomes lower relative to Pa with a reduction in the torque converter speed ratio e as shown in FIG. 10 (b). If the result of the decision is YES in the step. S3, the flow of control proceeds to a step S4, while if the result of the decision is NO in the step S3, the flow of control proceeds to the step S10.

In the step S4, a decision is made as to whether or not the shift switch 18 is operated to the first speed or the second speed, i.e., whether or not the speed stage of the transmission 3 is at the second speed or lower, which is a state in which an excavation work is to be performed. If the result of the decision is YES in the step S4, the flow of control proceeds to a step S5, while if the result of the decision is NO in the step S4, the flow of control proceeds to the step S10.

If the results of the decisions are all YES in the step S2 to the step S4, it is judged that the engine speed limitation condition is satisfied. In this event, it is judged that the vehicle is in a state where an excavation work is being performed with the bucket 112 being dug into a mound, so that the flow of control proceeds to the step S5. In the step S5, a decision is made as to whether or not the state in which the engine speed limitation condition is satisfied has continued for a predetermined period of time (for example, about 0.3 seconds). If the result of the decision is YES in the step S5, the flow of control proceeds to a step S6, while if the result of the decision is NO in the step S5, the flow of control proceeds to the step S10.

In the step S6, a decision is made as to the travel mode by a signal from the mode selection switch 19. If the result of the decision is the P mode in the step S6, the flow of control proceeds to a step S7. If the result of the decision is the N mode, the flow of control proceeds to a step S8. If the result of the decision is the L mode, the flow of control proceeds to step S9. In the step S7 to the step S9, a control signal is output to the engine control unit 22 so that the maximum engine speed Nlim is set to the respective predetermined value Np, Nn, or NL. As a result, the engine output torque characteristics during excavation work are expressed as A1 to A3 as shown in FIGS. 7 (a) to (c), respectively.

On the other hand, in the step S10, a control signal is output to the engine control unit 22 so that the maximum engine speed becomes the maximum Nmax (=Nc), i.e., the engine output torque characteristic while the pedal is fully depressed assumes the characteristic A0 of FIG. 6. In this case, the engine speed is controlled to a target speed according to the operation amount of the accelerator pedal 11.

Figure 11:
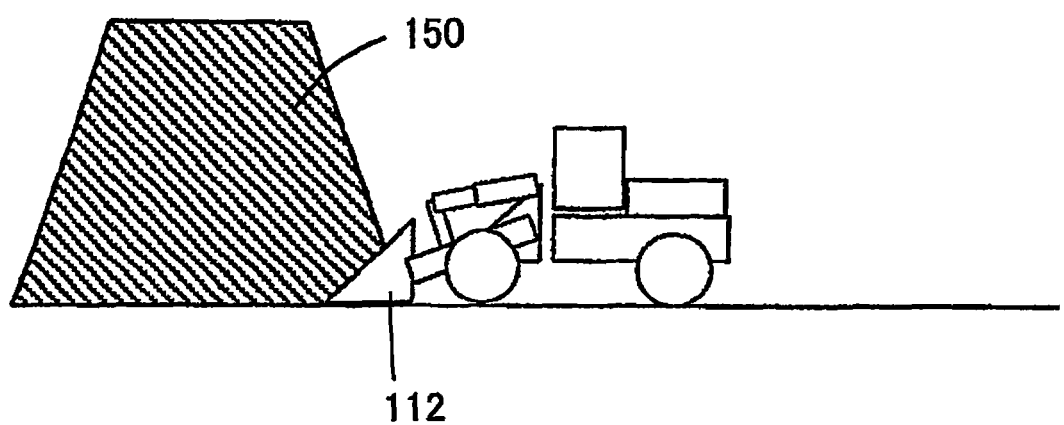
FIG. 11 An illustration showing an example of an excavation work.

The operations of the above embodiment are summarized as follows. Since a great travel driving force is required when the bucket 112 is dug into a mound during excavation work, the shift switch 18 is operated to the first speed or the second speed and the accelerator pedal 11 is fully depressed so that the vehicle travels forward. Then, as shown in FIG. 11, the operation lever is operated so as to drive the arm cylinder 114 with the bucket 112 being dug into a mound 150. At this time, due to an increase in traveling load, the torque converter speed ratio e becomes equal to or less than the predetermined value ea, and, due to an increase in working load, the pump discharge pressure P becomes equal to or greater than the predetermined value Pa. As a result, the engine speed limitation condition is satisfied, so that the maximum value of the engine speed is limited to the predetermined value Np, Nn, or NL according to the travel mode (the step S5 to the step S7).

A travel driving force is proportional to the square of the engine speed. Therefore, for instance, a travel driving force in the L mode becomes $(NL/Np)^2$ times as that in the P mode. Then, the travel driving force decreases greater in the L mode than it does in the P mode, so that the reaction force exerted upon the arm 111 from the soil or the like decreases. As a result, even if the accelerator pedal 11 is fully depressed, the travel driving force does not become too great, thereby allowing the bucket 112 to be lifted with ease.

The limitation amount of the travel driving force varies according to the travel mode, and the operator selects the travel mode according to the type of objects to be excavated such as soil. For instance, the P mode is selected in the event that the object to be excavated is hard, whilst the L mode is selected in the event that it is soft such as snow and sand. As a result, the bucket 112 can be operated to dig into the mound with ease with a great travel driving force in the event that the object to be excavated is hard. On the other hand, the arm 111 reaction force exerted upon is reduced so as to lift the bucket 112 with ease in the event that the object to be excavated is soft. As a result, work efficiency can be improved.

According to the first embodiment, the following operations and advantageous effects can be achieved.

(1) It is arranged that the maximum speed of the engine 1 is limited low upon satisfaction of the engine speed limitation conditions, that is, when the accelerator pedal operation amount s is equal to or greater than the predetermined value s1, the torque converter speed ratio e is equal to or less than the predetermined value ea, the pump load pressure is equal to or greater than the predetermined value Pa, and the speed stage of the transmission 3 is at the second speed or lower. As a result, an increase in travel driving force during excavation work can be reduced, and the bucket 112 can be lifted with ease, thereby improving workability. In other words, the following cumbersome operations performed by the operator so as to lift the arm 111 in the event that the travel driving force is too great to lift the bucket 112 can be skipped: a return operation of the accelerator pedal 11 so as to reduce the travel driving force and repeated tilt operation of the bucket 112.

(2) Since the maximum engine speed is reduced in place of shifting downward the characteristic B0 relating to the pump input torque, it is not required to shift the matching point by unnecessarily increasing the pump input torque, resulting in improved fuel economy. Since the maximum engine speed itself is reduced, the control arrangement is simple.

(3) Since it is arranged that the maximum engine speed is limited when the engine speed limitation conditions are continuously satisfied for a predetermined period of time, it is accurately judged that the vehicle is in a digging state so as to limit the speed, resulting in stable control operation.

(4) Since it is arranged that a set value of the maximum speed can be switched according to the travel mode, the maximum speed can be set to a value according to the object to be excavated, resulting in appropriate performance of excavation work.

(5) Since the maximum engine speed is limited upon satisfaction of the speed stage of the transmission 3 being the second speed or lower, the maximum speed of the engine 1 can be prevented from being limited other than during excavation work.

(6) Since the maximum engine speed is limited upon satisfaction of the accelerator pedal operation amount s being equal to or greater than the predetermined value s1, the engine speed is limited only in the event that the maximum speed is high, resulting in effective limitation of the engine speed.

Variations of the Second Embodiment

An engine control device for a working vehicle according to the second embodiment of the present invention will now be explained with reference to FIGS. 12 and 13.

Although in the first embodiment the maximum engine speed is limited upon satisfaction of the pump load pressure P being equal to or greater than the predetermined value Pa, in the second embodiment, on the contrary, the maximum engine speed is limited upon satisfaction of a lifting operation of the arm 111. The following explanation will focus upon the points in which they differ from those in the first embodiment.

Figure 12:
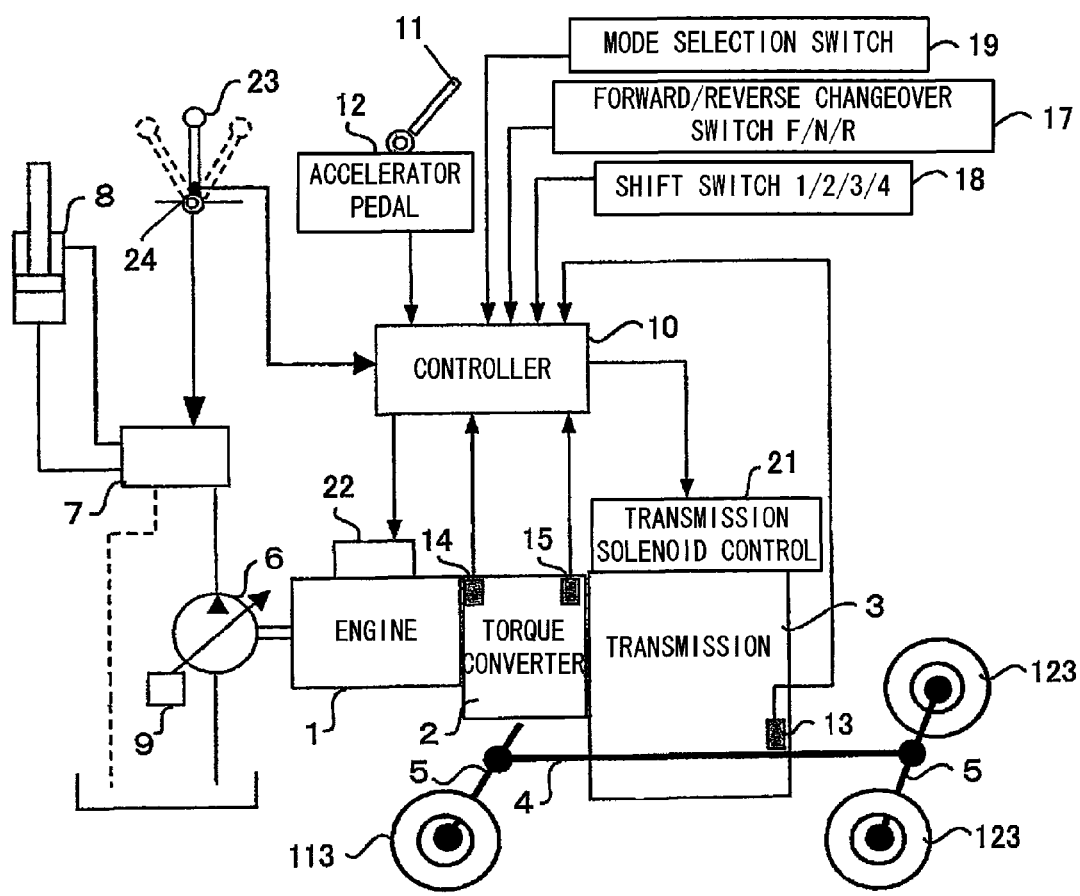
FIG. 12 A diagram showing the general structure of an engine control device according to the second embodiment of the present invention.

FIG. 12 is a diagram showing the general structure of the engine control device according to the second embodiment. It is to be noted that the same reference numerals are assigned to members identical to those in FIG. 2. In FIG. 12, an operation amount detector 24 such as a stroke sensor that detects an operation amount X of an arm cylinder driving operation lever 23 is provided and a signal from the operation amount detector 24 is input to the controller 10. A hydraulic sensor or the like that detects a pilot pressure exerted on the control valve 7 may be used as the operation amount detector 24.

Figure 13:
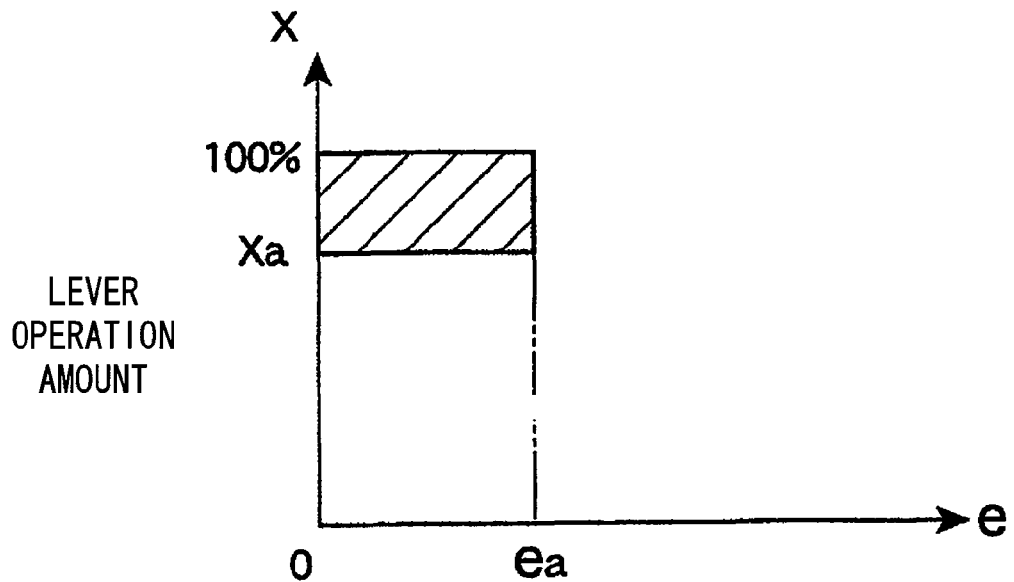
FIG. 13 Diagrams showing the speed limiting region related to the second embodiment.
Figure 13:
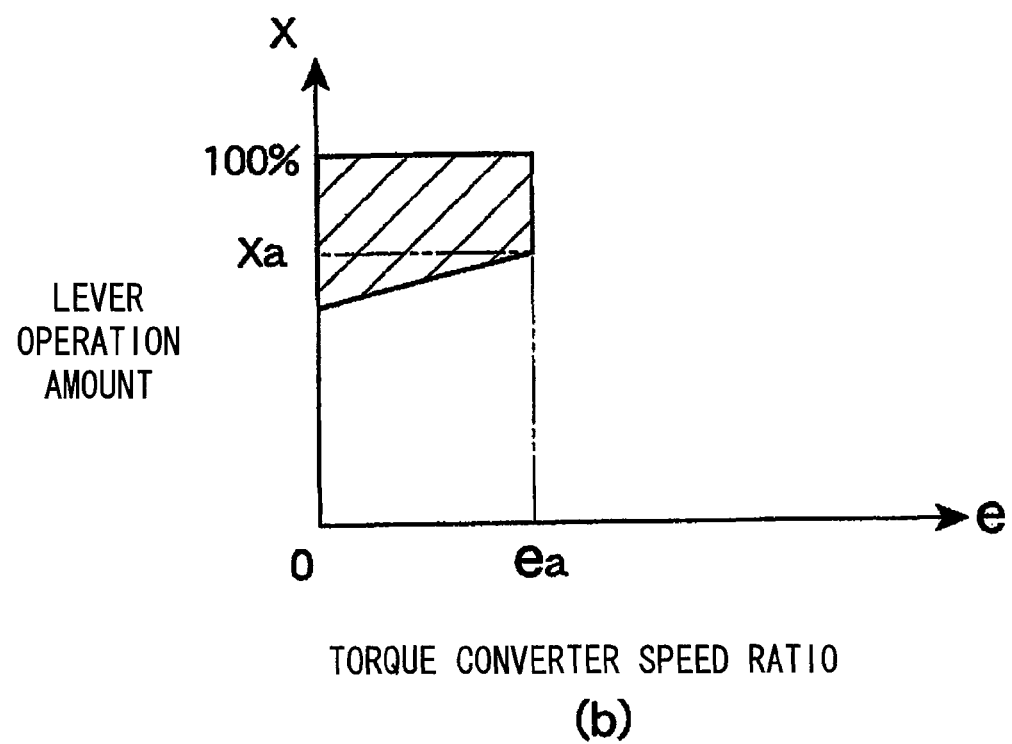

In the second embodiment, as shown in FIG. 13, a speed limiting region (hatched region) determined by the relationship between the torque converter speed ratio e and the lever operation amount X is stored in memory in advance. In the controller 10, the same processing as that in FIG. 9 is performed. At this time, in the step S3, a decision is made as to whether or not the torque converter speed ratio e and the lever operation amount X are in the speed limiting region of FIG. 13 (a). More specifically, a decision is made as to whether or not the torque converter speed ratio e is equal to or less than the predetermined value ea and the lever operation amount X is equal to or greater than a predetermined value Xa (X≧Xa). The predetermined value Xa corresponds to the lever operation amount for lifting the arm 111 after the bucket 112 is dug into the mound. It is to be noted that, in place of the threshold of the lever operation amount X being the constant value Xa, a speed limiting region may also be determined so that the threshold becomes smaller than Xa as the torque converter speed ratio e becomes smaller as shown in FIG. 13 (b).

In the second embodiment, the engine speed limitation condition is satisfied when the accelerator pedal operation amount s is equal to or greater than the predetermined value s1 (the step S2), the torque converter speed ratio e is equal to or less than the predetermined value ea, the lever operation amount X is equal to or greater than the predetermined value Xa (the step S3), and the speed stage of the transmission 3 is at the second speed or lower (the step S4). After the state continues for a predetermined period of time, the maximum speed of the engine 1 is limited low according to the travel mode (the step S7 to the step S9). As a result, similar to the first embodiment, an increase in travel driving force during excavation work can be reduced, and the bucket 112 can be lifted with ease, thereby improving workability.

The Third Embodiment

An engine control device for a working vehicle according to the third embodiment of the present invention will now be explained with reference to FIG. 14 to FIG. 16.

Although in the first and the second embodiments the maximum engine speed Nlim is set according to the travel mode (FIG. 8), in the third embodiment the maximum engine speed is changed over the course of time. It is to be noted that the following explanation will focus upon the points in which they differ from those in the first and the second embodiments.

Figure 14:
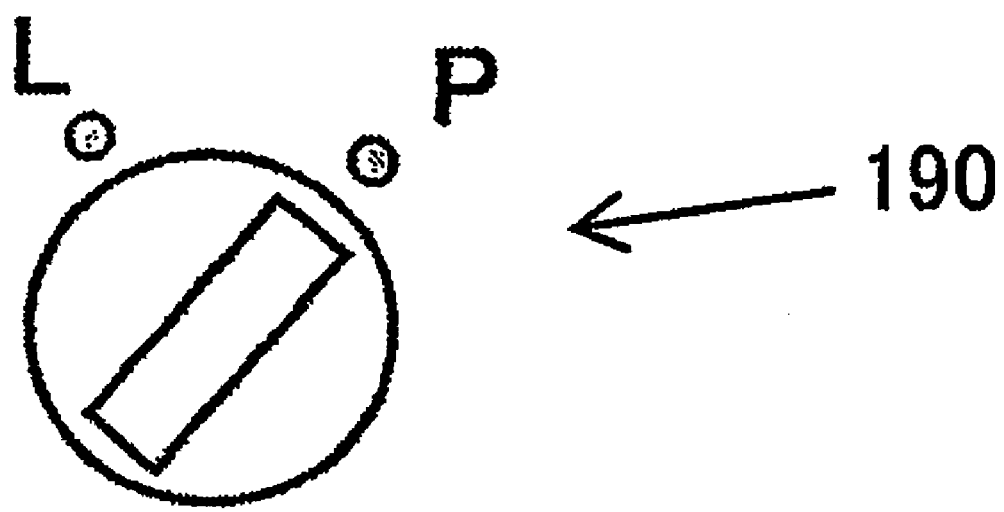
FIG. 14 An illustration showing the mode selection switch according to a third embodiment.
Figure 15:
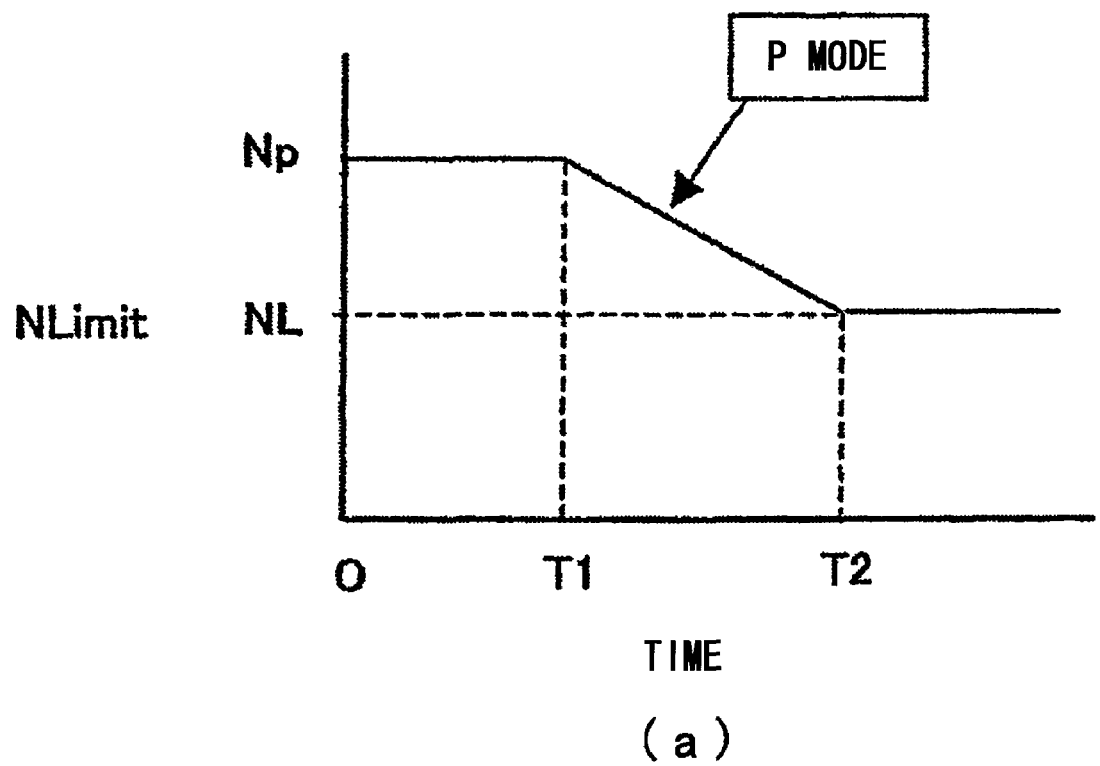
FIG. 15 Diagrams showing change in the maximum engine speeds by the engine control device according to the third embodiment.
Figure 15:
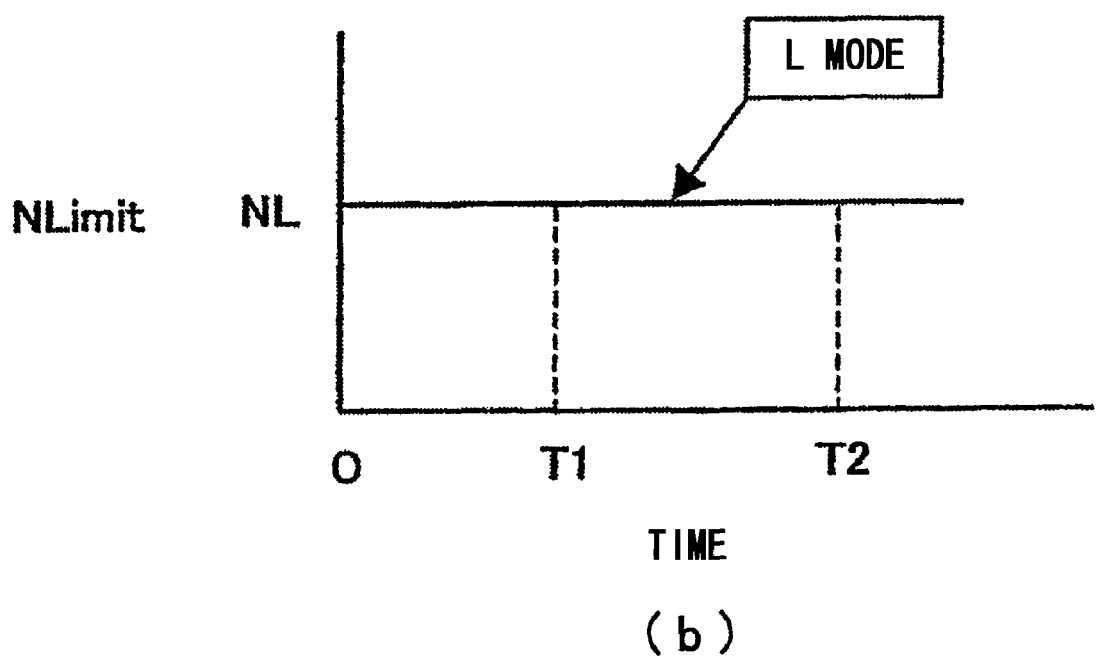

In the third embodiment, it is arranged that a mode changeover switch 190 shown in FIG. 14 is operated so that the travel mode can be switched between the P mode and the L mode. FIGS. 15 (*a*) and (*b*) are diagrams showing change in the maximum engine speed Nlim in the P mode and the L mode, respectively. As shown in FIG. 15 (*a*), when the P mode is selected, the maximum engine speed Nlim is Np in the range equal to or less than a predetermined period of time T1 (T≦T1), the maximum engine speed Nlim is gradually reduced from Np to NL in the range greater than the predetermined period of time T1 and equal to or less than a predetermined period of time T2 (T1<T≦T2), and the maximum engine speed Nlim is set to NL in the range exceeding the predetermined period of time T2 (T2<T). On the other hand, when the L mode is selected, the maximum engine speed Nlim is set to a constant value NL regardless of the passage of time.

Figure 16:
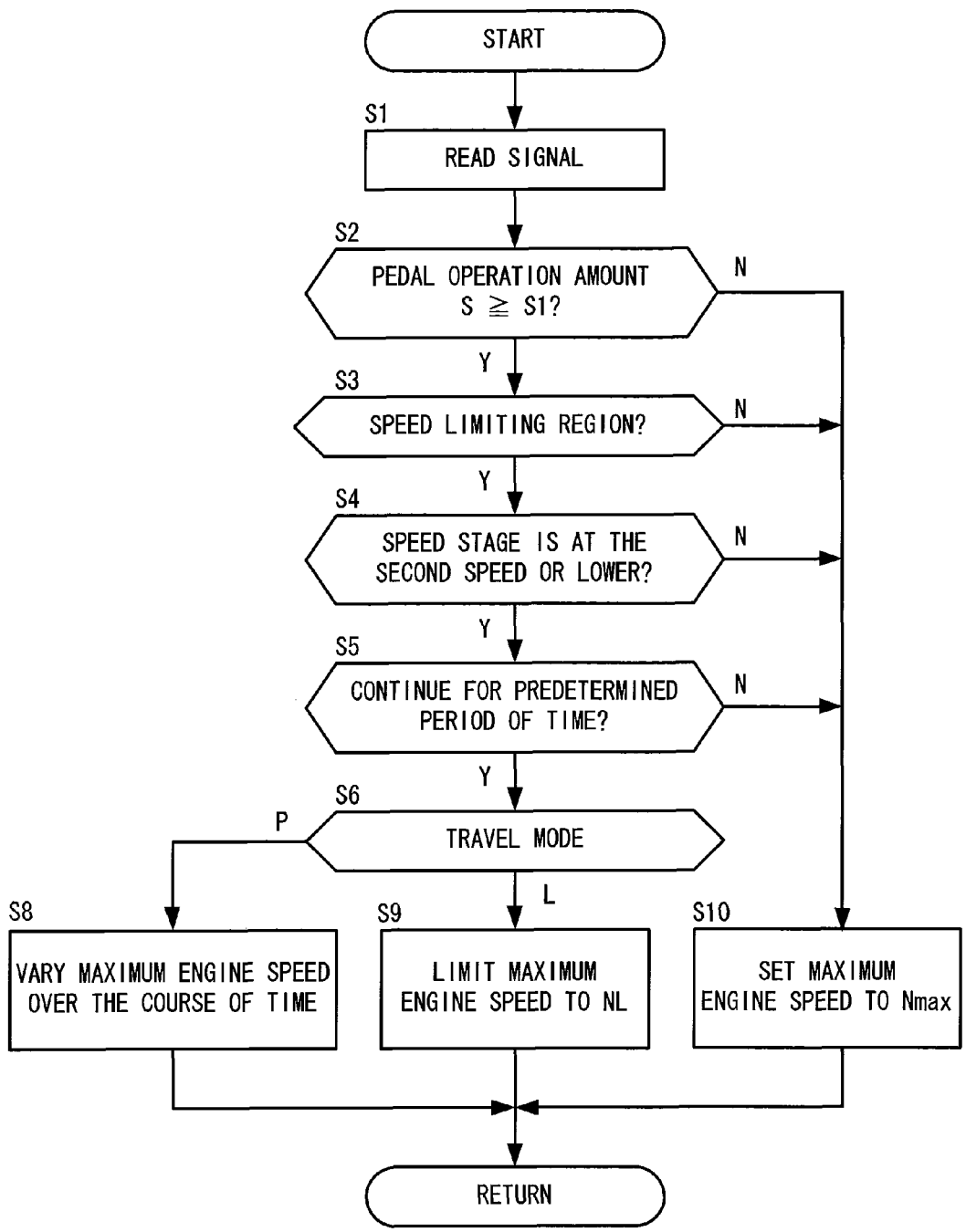
FIG. 16 A flowchart showing an example of processing executed by the controller according to the third embodiment.

FIG. 16 is a flowchart showing an example of processing executed by the controller 10 according to the third embodiment. It is to be noted that the same reference numerals are assigned to processes identical to those in FIG. 9. The characteristic of FIG. 15 (*a*) is stored in memory in the controller 10 in advance. In FIG. 16, when in the step S5 it is judged that the engine speed limitation conditions are continuously satisfied for a predetermined period of time, the flow of control proceeds to the step S6 so as to make a decision as to the travel mode. If the result of the decision is the P mode in the step S6, the flow of control proceeds to a step S11. In the step S11, a control signal is output to the engine control unit 22, so that the maximum engine speed Nlim varies according to the characteristic of FIG. 15 (*a*). On the other hand, if the result of the decision is the L mode in the step S6, the flow of control proceeds to the step S9, in which a control signal is output to the engine control unit 22 so that the maximum engine speed Nlim becomes the predetermined value NL.

In the third embodiment, when the P mode is selected with the mode selection switch 190, the maximum engine speed Nlim is set to Np after the engine speed limitation conditions are satisfied continuously for a predetermined period of time until the predetermined period of time T1 has elapsed. Therefore, the travel driving force becomes great enough to allow the bucket 112 to dig into the object to be excavated. After the predetermined period of time T1 has elapsed, the maximum engine speed Nlim gradually decreases over the course of time, and, after the predetermined period of time T2 has elapsed, the maximum engine speed becomes NL. As a result, the travel driving force can be automatically reduced after the bucket 112 is dug into the object, and the bucket 112 can be lifted with ease.

Thus, in the third embodiment, since it is arranged that the maximum engine speed Nlim is reduced over the course of time, the travel driving force can be automatically reduced when the bucket 112 is lifted after the bucket 112 is dug into the mound, resulting in achievement of excavation work with ease. Since the maximum engine speed Nlim is gradually reduced, a shock caused by the change in the engine speed is small.

It is to be noted that although in the above embodiment the transmission 3 is arranged to be variable from the first speed to the fourth speed, the speed stages of the transmission 3 may be variable at least between a low speed stage and a high speed stage. In the event that the transmission 3 is arranged to be variable between the low speed stage and the high speed stage, the low speed stage corresponds to the second speed or lower of the speed stages of the transmission 3 with the four speed stages. Therefore, any structure may be adopted in the controller 10 as a speed limiting unit as long as the maximum engine speed is limited to a lower speed at least when the pedal operation amount s is equal to or greater than the predetermined value s1, the torque converter speed ratio e is equal to or less than the predetermined value ea, the pump load pressure P is equal to or greater than the predetermined value Pa, and the speed stage of the transmission 3 is at the low speed stage, or at least when an operation of the working actuator 8 is detected, the pedal operation amount s is equal to or greater than the predetermined value s1, the torque converter speed ratio e is equal to or less than the predetermined value ea, and the speed stage of the transmission 3 is at the low speed stage.

Any structures may be adopted in the controller 10 and the engine control unit 22 as a rotation speed control unit as long as the engine speed N is controlled according to the operation amount of the accelerator pedal 11, i.e., as long as a target engine speed is increased with an increase in the operation amount of the accelerator pedal 11 and the engine speed is controlled to the target engine speed. Although it is arranged that the rotation of the engine 1 is transmitted to the tires 113 and 123 through the torque converter 2, the transmission 3, the propeller shaft 4, and the axles 5, any structure may be adopted in the travel drive device.

Although it is arranged that a pedal operation is detected by the accelerator operation amount detector 12, any structure may be adopted in the pedal operation amount detection unit. Although it is arranged that the torque converter speed ratio e is detected by the rotation speed detectors 14 and 15, any structure may be adopted in the speed ratio detection unit. Although it is arranged that pump load pressure is detected by the pressure detector 16, any structure may be adopted in the load pressure detection unit. Although it is arranged that the lever operation amount X is detected by the operation amount detector 24 so as to detect an operation of the arm cylinder 114, any structure may be adopted in the operation detection unit. Although it is arranged that the speed stage of the second speed or lower is detected by the shift switch 18, any structure may be adopted in the speed stage detection unit as long as it detects the low speed stage of the transmission 3 which is variable between the low speed stage and the high speed stage. Although it is arranged that the travel mode is selected with the mode selection switch 19 as a mode selection unit, the types of travel mode are not limited to those described above.

Although the example in which the present invention adopted in a wheel loader is explained above, the present invention may be adopted in the same manner in another working vehicle that includes a working machine upon which reaction force according to travel driving force is exerted. Namely, as long as the features and functions of the present invention are realized effectively, the present invention is not limited to the engine control device achieved in the embodiments.

The disclosure of the following priority application is herein incorporated by reference:

Japanese Patent Application No. 2007-276075 (filed on 24 Oct. 2007)

The invention claimed is:

1. An engine control device for a working vehicle that comprise:
a rotation speed control unit that controls a rotation speed of an engine according to an operation amount of an accelerator pedal;
a hydraulic pump driven by the engine, that supplies a driving pressure to a working actuator upon which a reaction force according to a travel driving force is exerted; and
a travel drive device that transmits a rotation of the engine to wheels through a torque converter,
wherein the engine control device for a working vehicle comprising:
a pedal operation amount detection unit that detects an operation amount of the accelerator pedal;
a speed ratio detection unit that detects a speed ratio of an input shaft and an output shaft of the torque converter;
a load pressure detection unit that detects a load pressure of the hydraulic pump;
a speed stage detection unit that detects a low speed stage of a transmission capable of varying a speed stage between a low speed stage and a high speed stage; and
a speed limiting unit that limits a maximum speed of the engine to a lower speed upon satisfaction of following speed limitation conditions: at least a pedal operation amount having been detected by the pedal operation amount detection unit is equal to or greater than a predetermined value, a speed ratio having been detected by the speed ratio detection unit is equal to or less than a predetermined value, a load pressure having been detected by the load pressure detection unit is equal to or greater than a predetermined value, and the low speed stage of the transmission has been detected by the speed stage detection unit.

2. An engine control device for a working vehicle according to claim 1, wherein:
the transmission is capable of being shifted into at least three speeds or more; and
the speed stage detection unit detects the low speed stage when a speed stage is at a second speed or lower.

3. An engine control device for a working vehicle according to claim 1, wherein:
the speed limiting unit limits a maximum speed of the engine upon satisfaction of the speed limitation conditions being continued for a predetermined period of time.

4. An engine control device for a working vehicle according to claim 1, comprising:
a mode selection unit that selects a travel mode, wherein:
the speed limiting unit varies a limit value of a maximum speed of the engine according to a travel mode having been selected by the mode selection unit.

5. An engine control device for a working vehicle according to claim 1, wherein:
the speed limiting unit reduces a limit value of a maximum speed of the engine over a course of time.

6. An engine control device for a working vehicle that comprises:
a rotation speed control unit that controls a rotation speed of an engine according to an operation amount of an accelerator pedal;
a hydraulic pump driven by the engine, that supplies driving pressure to a working actuator upon which a reaction force according to a travel driving force is exerted; and
a travel drive device that transmits a rotation of the engine to wheels through a torque converter,
wherein the engine control device for a working vehicle comprising:
a pedal operation amount detection unit that detects an operation amount of the accelerator pedal;
a speed ratio detection unit that detects a speed ratio of an input shaft and an output shaft of the torque converter;
an operation detection unit that detects an operation of the working actuator;
a speed stage detection unit that detects a low speed stage of a transmission capable of varying a speed stage between a low speed stage and a high speed stage; and
a speed limiting unit that limits a maximum speed of the engine to a lower speed upon satisfaction of following speed limitation conditions: at least an operation of the working actuator is detected by the operation detection unit, a pedal operation amount having been detected by the pedal operation amount detection unit is equal to or greater than a predetermined value, a speed ratio having been detected by the speed ratio detection unit is equal to or less than a predetermined value, and the low speed stage of the transmission has been detected by the speed stage detection unit.

7. An engine control device for a working vehicle according to claim 6, wherein:
the transmission is capable of being shifted into at least three speeds or more; and
the speed stage detection unit detects the low speed stage when a speed stage is at a second speed or lower.

8. An engine control device for a working vehicle according to claim 6, wherein:
the speed limiting unit limits a maximum speed of the engine upon satisfaction of the speed limitation conditions being continued for a predetermined period of time.

9. An engine control device for a working vehicle according to claim 6, comprising:
a mode selection unit that selects a travel mode, wherein:
the speed limiting unit varies a limit value of a maximum speed of the engine according to a travel mode having been selected by the mode selection unit.

10. An engine control device for a working vehicle according to claim 6, wherein:
the speed limiting unit reduces a limit value of a maximum speed of the engine over a course of time.

* * * * *